Aug. 13, 1940.   J. J. ELWELL   2,211,741
RECIPROCATORY TOOL
Original Filed May 15, 1937   2 Sheets-Sheet 1

Inventor
John J. Elwell

By J. J. Murray
Attorney

Patented Aug. 13, 1940

2,211,741

UNITED STATES PATENT OFFICE 2,211,741

RECIPROCATORY TOOL

John J. Elwell, Detroit, Mich.

Application May 15, 1937, Serial No. 142,838
Renewed January 10, 1940

10 Claims. (Cl. 74—56)

This invention relates to reciprocatory tools and particularly tools employing a rotary cam member to actuate a reciprocating tool shank.

An object of the invention is to provide an improved rotary cam mechanism for rapidly reciprocating a tool.

Another object is to adapt a spring to yieldably maintain operative engagement of a tool shank with a cam serving to reciprocate such shank.

Another object is to adapt a rotary cam to operatively engage and reciprocate a tool shank under pressure manually applied along the axis of rotation and to automatically shift said cam to a non-driving position, upon cessation of such pressure.

These and various other objects are attained by the construction hereinafter described and illustrated in the accompanying drawings, wherein.

Figures 1, 2:
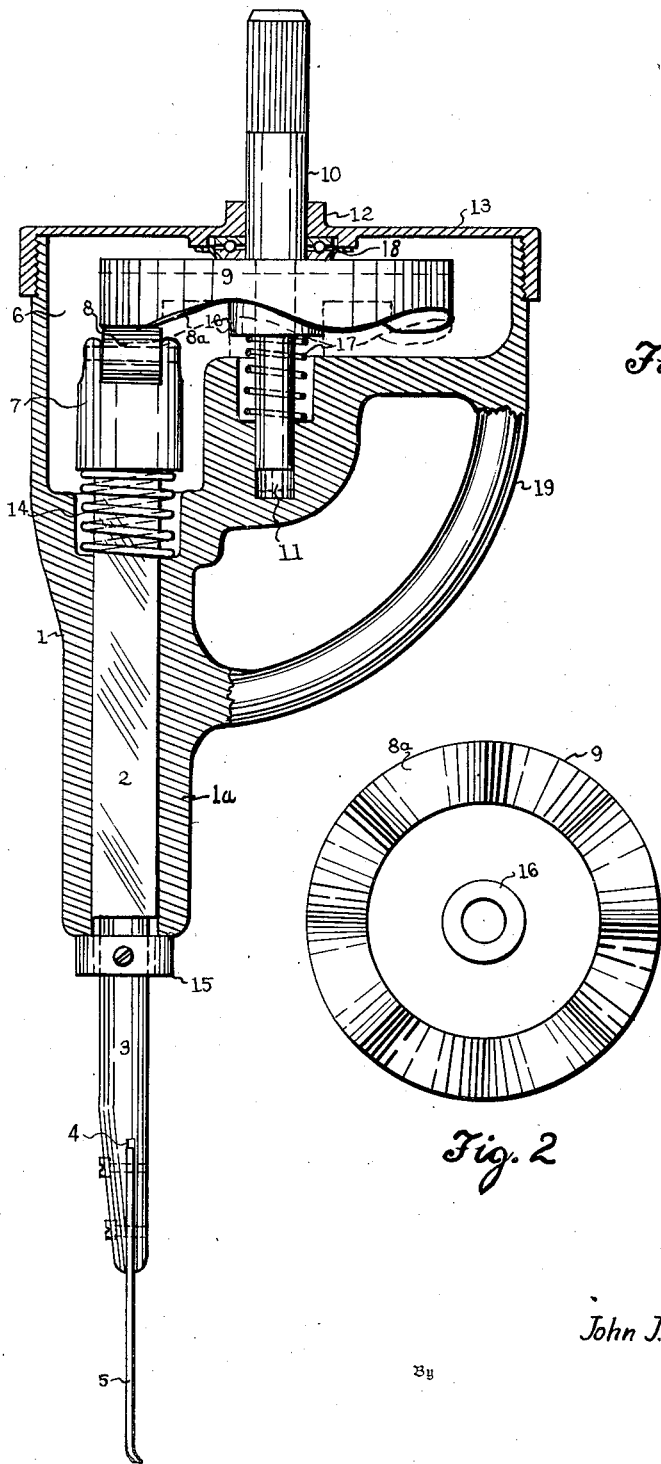
Fig. 1 is an axial sectional view of the improved tool, as employed for actuating a scraper.
Fig. 2 is a view of the working face of a cam member employed in the tool.

In these views, the reference character 1 designates a casing elongated to provide a mounting, at one side of the casing axis, for a reciprocatory tool shank 2. Said shank is preferably square or of other polygonal cross section and restrained from rotation by engagement in a correspondingly shaped opening of the casing. A cylindrical extension 3 of the shank projects beyond a reduced end 1a of the casing and is terminally and longitudinally slitted as indicated at 4, or otherwise adapted to accommodate a reciprocating tool 5. The particular tool illustrated is a metal scraper, but it is obvious that various other tools may be correspondingly carried by said shank.

Within a chamber 6 opening in the larger end portion of said casing, an enlarged head 7 is integrally or otherwise rigidly and terminally carried by the shank 2, and upon said head, at its end remote from the shank, is journaled a small roller 8 transversely aligned with the shank. The roller 8 is engaged by the sinuous, annular cam face 8a of a driving disk 9 fixed on a shaft 10, within the chamber 6. Said shaft is disposed axially of the casing 1 and journaled jointly in a socket 11 axially opening in the bottom of the chamber 6 and in a bearing 12 formed centrally and exteriorly on a cover 13 closing said chamber. The shank 2 is urged in a direction to interengage the roller 8 and cam face 8a by a coiled spring 14, compressed between the head 7 and bottom of the chamber 6, and a collar 15 fast on the extension 3 of said shank limits the response of the latter to the spring.

Compressed between the bottom of the chamber 6 and a hub 16 formed on the disk 9, in a surrounding relation to the shaft, is a coiled spring 17 urging said disk and the shaft 10 upwardly to the normal position shown in full lines in Fig. 1, in which position said parts may be driven without actuation of the shank 2.

Upon overcoming the spring 17 and lowering the shaft and member 9 to the dash line position in Fig. 1, the roller 8 is operatively engaged by said member. A suitable thrust bearing 18 establishes the idling position of the shaft and member 9, shown in full lines, and as illustrated, said bearing incorporates suitable anti-friction elements. The casing 1 may be exteriorly formed with any suitable form of handle, as exemplified at 19.

In operation of the tool, the splined upper end of the shaft 10 is engaged by any desired driving element such as a flexible shaft or portable motor (not shown). The shaft and driving member 9 rotate freely until the operator applies sufficient pressure axially of the shaft and against any piece of work (not shown), to shift said driving member to its lowered or dash line position. Thereupon, the sinuous cam face 8a of said member operatively engages the roller 8, and each revolution of said member accomplishes several reciprocations of the shank 2. Following each down stroke of the shank 2, the latter is raised by the spring 14 to conform to the reentrant portions of the cam face.

Figure 3:
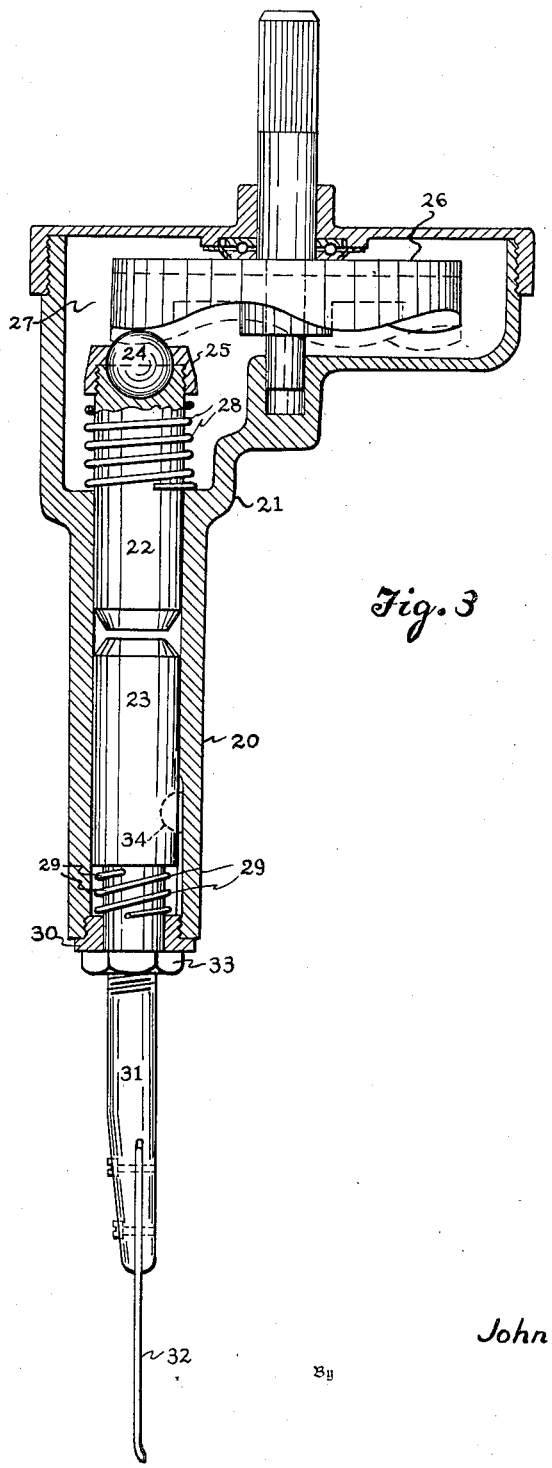
Fig. 3 is a view similar to Fig. 1, but showing a modified drive mechanism.

In the modified construction, shown in Fig. 3, the tubular downward extension 20 of the casing 21 houses upper and lower reciprocatory plungers 22 and 23. The upper plunger carries a freely rotative steel ball 24 terminally socketed in said plunger and held thereon by a ring 25, and projecting through and above said ring. An actuating disk 26, rotating in a chamber 27 in the upper end of the casing, is formed with a sinuously cammed under face, and the ball 24 is held in engagement with such face by a spring 28 coiled between the ring 25 and the bottom of the chamber 27. The lower plunger is upwardly urged by a spring 29 coiled around a reduced lower portion of said plunger, and seated on a bushing 30 threaded into the lower end of the extension 20. Projecting from the lower plunger, beneath the extension 20 is a shank 31, carrying a scraper 32 or some other driven tool. A nut 33 threaded on the upper portion of the shank 31 forms a stop establishing an upper limiting position for the lower plunger, such as to slightly space the two plungers, when the actuating disk 26 is in its illustrated raised idling position. A Woodruff key 34 or the like restrains the lower plunger from rotation.

In its modified form, just described, the invention operates substantially as does the first described construction, except that the upper plunger imposes periodic hammer blows on the lower one, upon driving the actuating member in its lowered position, indicated in dash lines. Thus the working strokes of the tool 32 are more abruptly and powerfully energized.

Thus the mechanism, in a simple manner, transforms the rotary motion of the driving member into reciprocation of the driven member. While the described tool is particularly applicable to energization of a reciprocatory scraper, it is readily adaptable to numerous other purposes.

The invention is presented as including all such modifications and changes as come within the scope of the following claims.

What I claim is:

1. A tool comprising a reciprocatory tool shank, a shaft journaled at one side of and parallel to the axis of reciprocation of the shank, a cam fixed on the shaft and having a projection for driving the shank from the cam, a spring urging the shank into normal operative engagement with such cam, means limiting movement of the shank responsive to the spring, and a second spring effective on the cam and shaft to urge the cam clear of the shank.

2. A tool comprising an elongated casing having a chamber opening in an end thereof, a tool shank reciprocatory in the casing, longitudinally thereof, and having an end portion projecting into the chamber, a shaft journaled in the casing at one side of and parallel to the axis of reciprocation of the shank, a cam member fixed on the shaft within the chamber and having a projection for driving the shank from the cam, a spring within the chamber urging the shank into operative engagement with the cam, and means carried by the shank, exteriorly of the casing, limiting its response to the spring.

3. A tool comprising a reciprocatory tool shank, a drive shaft journaled at one side of and parallel to the axis of reciprocation of the shank, a cam fixed on the shaft and having a projection for driving the shank from the cam, a spring urging the shank toward said cam, and means limiting response of the shank to the spring, the cam being normally ineffective on the shank, and said shaft having a longitudinal play such as to shift the cam into operative engagement with the shank.

4. A tool comprising a casing formed with a chamber, a tool shank projecting, at one end, exteriorly of the casing, to carry a tool, and extending, at its other end, into said chamber, a shaft journaled and slidable in said casing at one side of the axis of reciprocation of the shank, and extending through said chamber, a cam fixed on the shaft within the chamber and having a projection for driving the shank from the cam, and engageable with the casing in limiting sliding positions of said shaft to limit sliding play of the shaft, a spring urging the shank toward the cam, and coacting means on the shank and casing limiting response of the shank to the spring, the cam, in one limiting position thereof, operatively engaging the shank, and rotating substantially clear of the shank in its other limiting position.

5. A tool comprising a rotary cam member, a plunger periodically actuable by the cam member, a spring urging the plunger into operative engagement with the cam member, a second plunger aligned with the first-mentioned plunger, to be driven thereby, a spring urging the driven plunger toward the driving plunger, a stop element on the driven plunger limiting its response to the corresponding spring, and a tool operatively carried by the driven plunger.

6. A tool comprising aligned driving and driven plungers, a spring urging the driven plunger toward the driving plunger, a stop member limiting response of the driven plunger to such spring, a spring urging the driving plunger from the driven plunger, means for periodically actuating the driving plunger toward and against the driven plunger, and a tool operatively mounted on the driven plunger.

7. In combination, a casing having a tubular extension, a driving plunger and a driven plunger aligned within such extension, a stop member carried by the driven plunger, an abutment carried by said extension and engageable by the stop member to limit travel of the driven plunger toward the driving plunger, a spring reacting against said abutment and urging the driven plunger toward the driving plunger, means within the casing for periodically actuating the driving plunger toward and against the driven plunger, and a tool reciprocatory by the driven plunger.

8. In combination, a casing formed with a chamber and with a tubular extension opening from such chamber, two plungers mounted in said extension, one driving the other, the driving plunger projecting from the extension into said chamber, a cam rotative in said chamber about an axis parallel to said extension, and effective to periodically actuate the driving plunger toward and against the driven plunger, driving means for said cam, a spring within said chamber urging the driving plunger into actuable engagement with the cam, a spring urging the driven plunger toward the driving plunger, a stop on the driven plunger engageable with said extension to limit response of the driven plunger to the last-mentioned spring, and a tool reciprocatory by the driven plunger.

9. The combination set forth in claim 8, said cam having a limited play along its axis in said chamber to render it ineffective on the tool, except when shifted toward the tool.

10. In combination, a casing formed with a chamber and with a tubular extension opening from said chamber, a plunger reciprocatory in said tubular extension, a tool carried by said plunger, exteriorly of the casing, a cam rotative within said chamber about an axis substantially parallel to said extension and having a projection for driving the plunger from the cam, a spring yieldably urging the plunger toward the cam, and a member interposed between the plunger and cam for transmitting the thrust of the cam to the plunger, the cam having a limited axial sliding play within said chamber adequate to establish or disestablish its driving relation with said thrust-transmitting member, whereby it requires actuation toward such transmitting member to take effect thereon.

JOHN J. ELWELL.